(12) United States Patent
Kim

(10) Patent No.: US 7,367,788 B2
(45) Date of Patent: May 6, 2008

(54) PUMP FOR ANTILOCK BRAKING SYSTEM IN VEHICLE

(75) Inventor: Young-Kyu Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 456 days.

(21) Appl. No.: 11/024,763

(22) Filed: Dec. 30, 2004

(65) Prior Publication Data

US 2005/0206227 A1   Sep. 22, 2005

(30) Foreign Application Priority Data

Mar. 22, 2004   (KR) ...................... 10-2004-0019279

(51) Int. Cl.
  *F04B 19/00*  (2006.01)
  *F04B 39/00*  (2006.01)
  *F16K 17/00*  (2006.01)
  *B60T 8/40*  (2006.01)

(52) U.S. Cl. .................. 417/470; 417/454; 137/512.5; 137/539; 303/116.4

(58) Field of Classification Search ................ 417/454, 417/470, 569, 571, 545, 549; 137/512, 512.5, 137/539, 606; 303/116.4, 119.2, 119.3
See application file for complete search history.

(56) References Cited

U.S. PATENT DOCUMENTS

| 1,937,150 | A  * | 11/1933 | Hueber et al. ............... 417/364 |
| 3,101,093 | A  * | 8/1963 | White, Jr. et al. ........... 137/316 |
| 4,862,911 | A  * | 9/1989 | Yie ......................... 137/454.4 |
| 5,251,669 | A  * | 10/1993 | Bishop .................... 137/625.23 |
| 5,915,927 | A  * | 6/1999 | Kuromitsu ................... 417/250 |
| 6,457,956 | B1 * | 10/2002 | Hauser et al. ............... 417/470 |
| 6,589,032 | B2 * | 7/2003 | Summers et al. ........... 417/549 |
| 6,644,621 | B2 | 11/2003 | Ji et al. |
| 6,971,858 | B2 | 12/2005 | Ahn |
| 2003/0021709 | A1* | 1/2003 | Okuya et al. ................ 417/470 |

* cited by examiner

Primary Examiner—Devon C. Kramer
Assistant Examiner—Peter J Bertheaud
(74) Attorney, Agent, or Firm—Greenblum & Bernstein, P.L.C.

(57) ABSTRACT

A pump including a main body having a piston provided in a portion of the main body, the piston being configured to reciprocate linearly. A piston spring may be provided within the main body and configured to bias the piston toward an end of the main body. Further, a plurality of intake check valves may be positioned radially within the main body and configured to move in a direction generally perpendicular to the linearly reciprocating direction of the piston such that brake fluid is introduced into the main body. Additionally, the pump may include an exhaust check valve configured to exhaust brake fluid from an inside of the main body to an exterior of the main body by moving an exhaust check ball in the linearly reciprocating direction of the piston.

12 Claims, 2 Drawing Sheets

PUMP FOR ANTILOCK BRAKING SYSTEM IN VEHICLE

CROSS-REFERENCE TO RELATED APPLICATIONS

The present application is based on, and claims priority from, Korean Application Serial Number 10-2004-0019279, filed on Mar. 22, 2004.

FIELD OF THE INVENTION

The present invention relates to a pump used in an antilock-braking system (ABS) of a vehicle. More particularly, the present invention relates to a pump installed in an ABS modulator to generate a rapid and intermittent hydraulic brake pressure.

BACKGROUND OF THE INVENTION

Generally, the antilock-braking system (ABS) of a vehicle provides a rapid intermittent hydraulic brake pressure to each wheel for averting wheel lockup by detecting the variation of wheel rotations during braking.

The pump generating the rapid intermittent hydraulic brake pressure is primarily a piston pump installed at the ABS modulator. A cam rotating via a motor repeatedly presses a piston, resiliently supported by a spring, in a short time period interval to thereby generate the intermittent hydraulic pressure.

SUMMARY OF THE INVENTION

Embodiments of the present invention are provided with an antilock-braking system (ABS) pump adapted to reduce the intake resistance of the brake fluid, simplify the structure, and decrease the overall size thereof.

A pump for the antilock-braking system (ABS) comprises a main body. A piston is installed at a portion thereof in the main body to engage in a linear reciprocating motion. A piston spring is installed in the main body in a state of pushing the piston to the exterior of the main body. Intake check valves are configured to take brake fluid into the main body by allowing intake check balls to move in a direction generally perpendicular to the linear reciprocating movement of the piston. An exhaust check valve is configured to exhaust the brake fluid from the main body to the exterior by moving an exhaust check ball in the same direction as the linear reciprocating movement of the piston.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
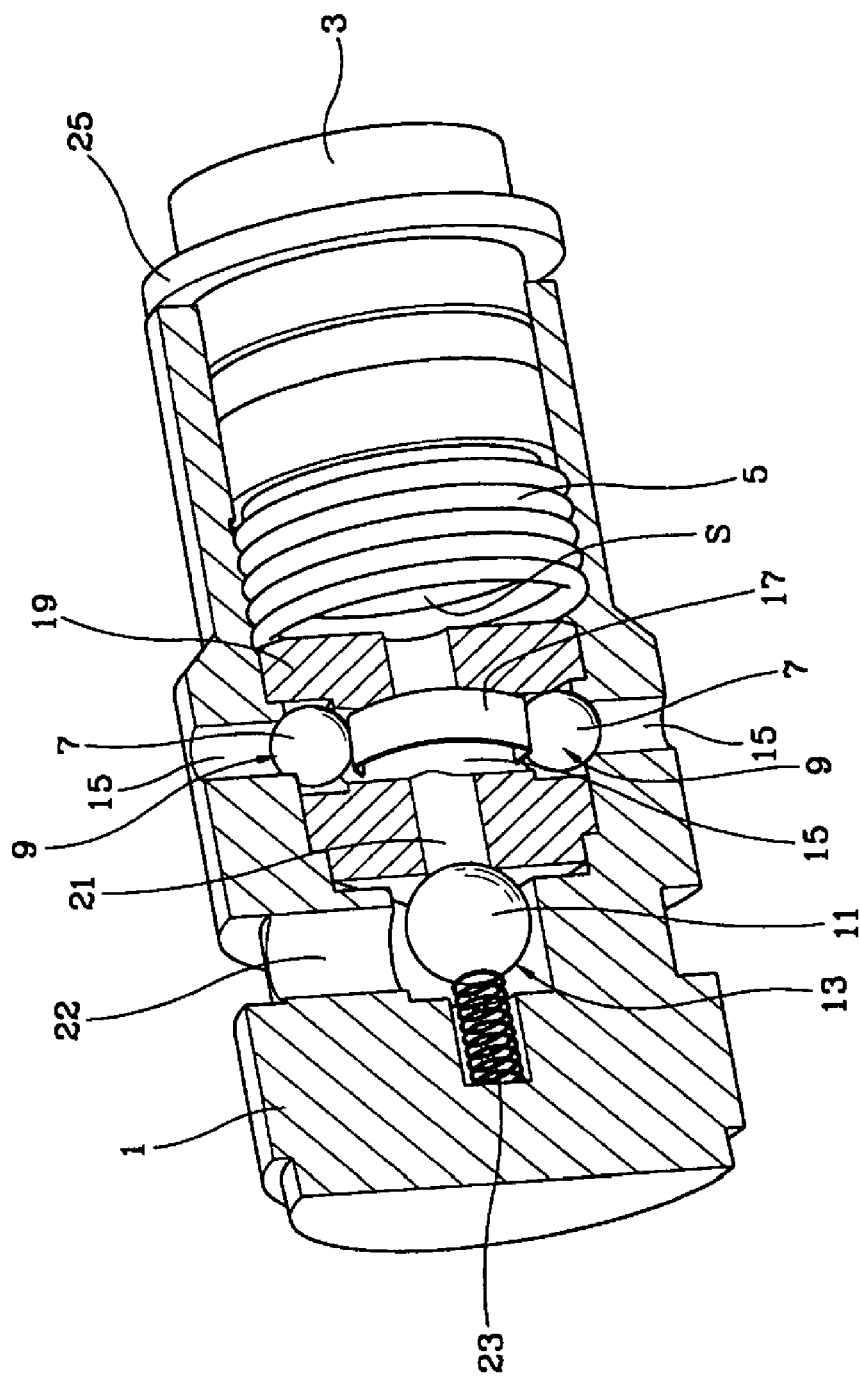
FIG. 1 illustrates a pump structure of an antilock-braking system according to an embodiment of the present invention.

Referring to FIG. 1, a pump of an antilock-braking system according to an embodiment of the present invention comprises a main body 1. A piston 3 is installed at a portion thereof in the main body 1 to engage in a linear reciprocating motion. A piston spring 5 is installed in the main body 1 in a state of biasing the piston 3 toward the exterior of the main body 1. Intake check valves 9 are configured to take brake fluid into the main body 1 by allowing intake check balls 7 to move in a direction generally perpendicular to the direction of the linear reciprocating movement of the piston 3. An exhaust check valve 13 is configured to exhaust the brake fluid from the main body 1 to the exterior by moving an exhaust check ball 11 in the same direction as the direction of the linear reciprocating movement of the piston 3.

The intake check valves 9 include a fluid intake passage 15, two intake check balls 7, and an intake spring 17. The fluid intake passage 15 is formed to penetrate the main body 1 in a direction generally perpendicular to the direction of the linearly reciprocating movement of the piston 3. The two intake check balls 7 are located at opposite sides of the fluid intake passage 15 in relation to an axis that penetrates the center of the piston 3. The intake spring 17 is positioned between the two intake check balls 7 to apply the resilient force to the two intake check balls 7.

Figure 2:
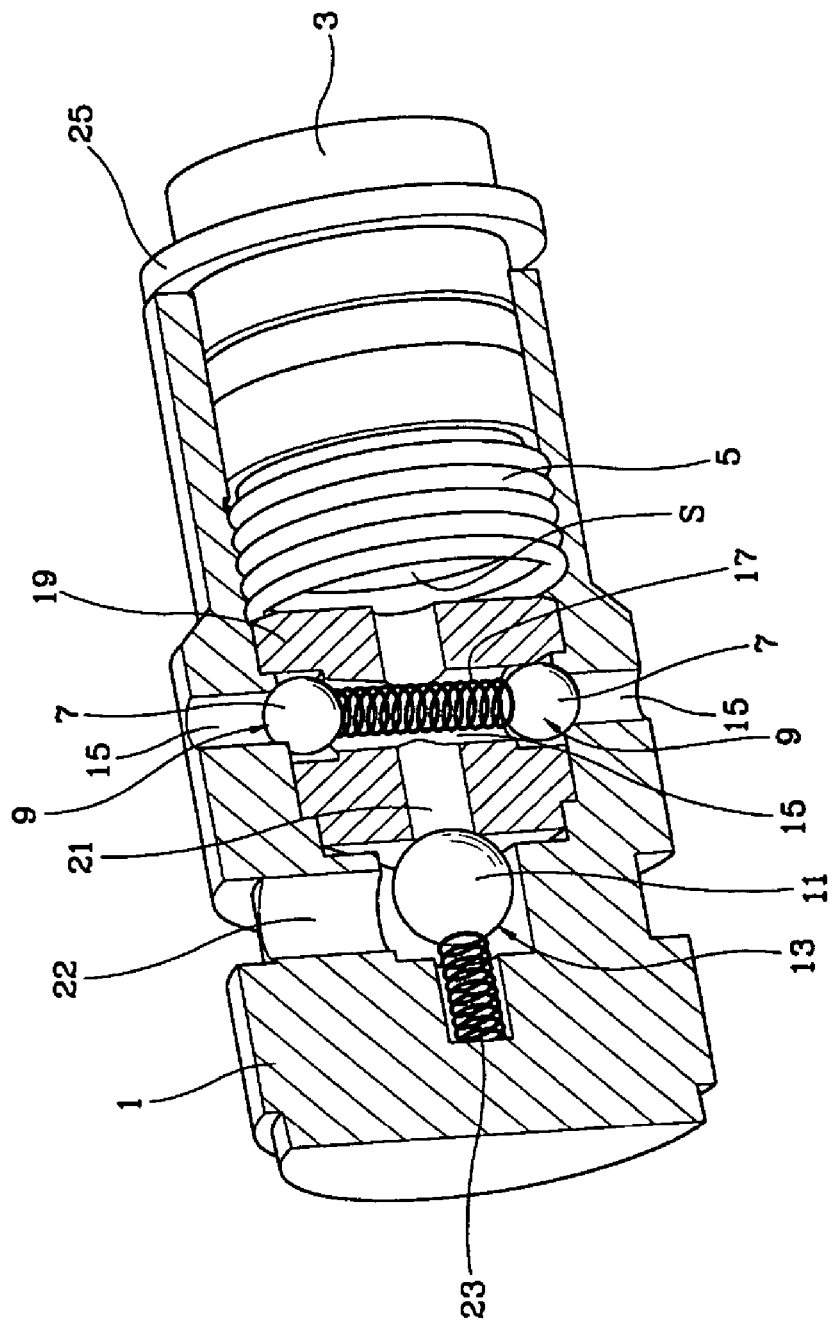
FIG. 2 illustrates another embodiment of the present invention.

The intake spring 17 is formed in a "C" shape by bending a spring steel plate in the first embodiment of the present invention. With reference to FIG. 2, the intake spring 17 can be substituted by a coil spring according to another embodiment of the present invention.

The intake spring 17 and intake check balls 7 of the intake check valves 9 are disposed perpendicularly to the linear reciprocating movement direction of the piston 3; thus, the pump length regarding the linear reciprocating movement of the piston 3 can be shortened.

The intake spring 17 supports both of the intake check balls 7, thereby reducing the number of required components.

The main body 1 is installed with an insert 19 therein. The insert 19 is placed between the piston spring 5 and exhaust check valve 13. The insert 19 is provided with the intake spring 17, and some portions of the fluid intake passage 15 are formed in the insert 19. The insert 19 is also formed with a fluid exhaust passage 21 that connects a pumping space (S), which is formed by the piston 3, piston spring 5, and main body 1, with the exhaust check valve 13.

The fluid exhaust passage 21 connects with an exhaust hole 22 formed in the main body 1.

The exhaust check ball 11 and exhaust spring 23 constitutes the exhaust check valve 13. The exhaust check ball 11 is located along the axis, passing through the center of the piston 3, and contacts the insert 19. The exhaust spring 23 forcibly presses the exhaust check ball 11 towards the insert 19.

The exhaust check ball 11 configured to contact the insert 19 helps to reduce the length of the pump.

The insert 19 is assembled into the main body 1 with the intake spring 17 and intake check balls 7 provisionally coupled to the insert 19, thus simplifying the pump assembly.

As two intake check valves 9 and one exhaust check valve 13 are used in the embodiment of the present invention, the overall intake cross-sectional area of the brake fluid increases, thereby decreasing the intake resistance occurred when the brake fluid enters into the pump.

The piston 3 is integrally mounted with a stopper 25 having a circular shape configuration and protruding out at the periphery of the piston 3 to restrict the insertion amount of the piston 3 into the main body 1. As shown in FIGS. 1 and 2, the piston 3 is shown in its fully compressed condition, with the stopper 25 engaged with the main body 1.

The operation of the pump thus constructed will now be described.

When a cam (not shown) intermittently presses the piston 3 as the cam rotates, the piston 3 starts to linearly reciprocate in the main body 1 via the piston spring 5 and cam. When the piston 3 is pushed away via the piston spring 5, the intake check valves 9 are opened and the brake fluid enters into the main body 1. If the piston 3 is forcibly inserted into the main body 1 via the cam, the exhaust check valve 13 is opened and the brake fluid discharges from the main body 1.

As apparent from the foregoing, there is an advantage in that a plurality of intake check valves are perpendicularly installed in relation to the direction of the linear reciprocating motion of a piston, thereby reducing intake resistance of the brake fluid, decreasing the overall size of the pump, and simplifying the structure and assembly thereof.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed is:

1. A pump for an antilock-braking system, said pump comprising:
    a main body;
    a piston provided within a portion of said main body, wherein the piston is configured to reciprocate linearly;
    a piston spring provided within said main body, wherein the piston spring is configured to bias said piston toward an end of said main body;
    a plurality of intake check valves positioned radially within said main body and configured to move in a direction generally perpendicular to a linearly reciprocating direction of said piston such that brake fluid is introduced into said main body, the plurality of intake check valves comprising:
    a fluid intake passage provided in said main body and extending in a direction generally perpendicular to the linearly reciprocating direction of said piston,
    intake check balls positioned at opposing sides of said fluid intake passage with respect to a central axis of said piston, and
    an intake spring positioned between said opposing check balls, wherein the intake spring is configured to apply a resilient force to said opposing intake check balls; and
    an exhaust check valve configured to exhaust brake fluid from an inside of said main body to an exterior of said main body by moving an exhaust check ball in the linearly reciprocating direction of the piston.

2. The pump according to claim 1, wherein said intake spring comprises a spring steel plate having a generally "C" shape.

3. The pump according to claim 1, wherein said intake spring comprises a coil spring.

4. The pump according to claim 1, further comprising an insert provided within said main body, wherein said insert is positioned between said piston spring and said exhaust check valve, wherein said insert is provided with said intake spring and comprises portions of said fluid intake passage, and wherein said insert further comprises a fluid exhaust passage that connects a pumping space defined by said piston, said piston spring, and said main body to said exhaust check valve.

5. The pump according to claim 4, wherein said exhaust check valve includes:
    an exhaust check ball aligned with the central axis of said piston and contacting said insert; and
    an exhaust spring configured to bias said exhaust check ball towards said insert.

6. The pump according to claim 1, wherein said piston is integrally provided with a stopper having a generally circular shape, wherein the stopper protrudes outwardly at a periphery of said piston to restrict an insertion amount of said piston into said main body.

7. A pump for an antilock-braking system, said pump comprising:
    a main body;
    a piston provided within a portion of said main body, wherein the piston is configured to reciprocate linearly;
    a piston spring provided within said main body, wherein the piston spring is configured to bias said piston toward an end of said main body;
    a plurality of intake check valves configured to move in a direction generally perpendicular to a linearly reciprocating direction of said piston such that brake fluid is introduced into said main body,
    the intake check valves comprising:
    a fluid intake passage provided in said main body and extending in a direction generally perpendicular to the linearly reciprocating direction of said piston,
    intake check balls positioned at opposing sides of said fluid intake passage with respect to a central axis of said piston, and
    an intake spring positioned between said opposing check balls, wherein the intake spring is configured to apply a resilient force to said opposing intake check balls; and
    an exhaust check valve configured to exhaust brake fluid from an inside of said main body to an exterior of said main body by moving an exhaust check ball in the linearly reciprocating direction of the piston.

8. The pump according to claim 7, wherein said intake spring comprises a spring steel plate having a generally "C" shape.

9. The pump according to claim 7, wherein said intake spring comprises a coil spring.

10. The pump according to claim 7, further comprising an insert provided within said main body, wherein said insert is positioned between said piston spring and said exhaust check valve, wherein said insert is provided with said intake spring and comprises portions of said fluid intake passage, and wherein said insert further comprises a fluid exhaust passage that connects a pumping space defined by said piston, said piston spring, and said main body to said exhaust check valve.

11. The pump according to claim 10, wherein said exhaust check valve includes:
    an exhaust check ball aligned with the central axis of said piston and contacting said insert; and
    an exhaust spring configured to bias said exhaust check ball towards said insert.

12. The pump according to claim 7, wherein said piston is integrally provided with a stopper having a generally circular shape, wherein the stopper protrudes outwardly at a periphery of said piston to restrict an insertion amount of said piston into said main body.

* * * * *